(12) United States Patent
Liu

(10) Patent No.: US 7,536,574 B2
(45) Date of Patent: May 19, 2009

(54) WIRELESS COMPUTER PERIPHERAL DEVICE

(75) Inventor: Chih-Min Liu, Sanchong (TW)

(73) Assignee: Kye Systems Corporation, Taipei Hsien (TW)

( * ) Notice: Subject to any disclaimer, the term of this patent is extended or adjusted under 35 U.S.C. 154(b) by 579 days.

(21) Appl. No.: 11/377,174

(22) Filed: Mar. 17, 2006

(65) Prior Publication Data

US 2007/0135066 A1    Jun. 14, 2007

(30) Foreign Application Priority Data

Dec. 14, 2005   (TW) .............................. 94144193 A

(51) Int. Cl.
*G06F 1/32* (2006.01)
(52) U.S. Cl. ...................... 713/320; 713/300
(58) Field of Classification Search ................. 713/300, 713/320
See application file for complete search history.

(56) References Cited

U.S. PATENT DOCUMENTS

| | | | | |
|---|---|---|---|---|
| 4,812,672 A | * | 3/1989 | Cowan et al. ................. | 307/64 |
| 5,187,396 A | * | 2/1993 | Armstrong et al. ............ | 327/65 |
| 5,703,415 A | * | 12/1997 | Tanaka ......................... | 307/66 |
| 6,118,188 A | * | 9/2000 | Youssef ........................ | 307/43 |
| 6,285,091 B1 | * | 9/2001 | Chan et al. .................... | 307/64 |
| 6,642,750 B1 | * | 11/2003 | Egan ............................ | 327/63 |
| 6,801,967 B2 | * | 10/2004 | Nakamura et al. ............ | 710/62 |
| 7,388,361 B2 | * | 6/2008 | Hsieh et al. .................. | 323/285 |

* cited by examiner

*Primary Examiner*—Nitin C Patel
(74) *Attorney, Agent, or Firm*—Ming Chow; Sinorica, LLC

(57) ABSTRACT

The present invention relates to a wireless computer peripheral device that comprises a first power detecting unit with a set first threshold value, coupled to the first power and; and a second power detecting unit with a set second threshold value, coupled to the first power, second power and the first power detecting unit; thereby, the power energy supplied from the second power will be cut off and the power energy supplied from the first power will be provided to the wireless computer peripheral device for using when the power energy stored in the first power is higher than the power energy stored in the second power; and the power energy supplied from the first power will be cut off and the power energy supplied from the second power will be provided to the wireless computer peripheral device for using when the power energy stored in the first power is lower than or equal to the power energy stored in the second power. Furthermore, the present invention also provides a power supplying method for wireless computer peripheral device.

15 Claims, 7 Drawing Sheets

WIRELESS COMPUTER PERIPHERAL DEVICE

BACKGROUND OF THE INVENTION

1. Field of the Invention

The present invention relates to a wireless computer peripheral device and its power supplying method, and more particularly to a wireless computer peripheral device uses a voltage detector and electronic switches to control the power supply between the battery and solar energy storing device so as to extend the using time of the battery.

2. Description of the Related Art

In general, the using life of the battery is a great point of the wireless computer device, the general design is to reduce the power consumption and add the battery capacity. However, to reduce the power consumption or add the battery capacity also has its limit; therefore, there is no immediately effect to improve the using life and time of the battery of wireless computer device.

One of the prior arts related the solar cell, such as Taiwan Pat. No. 197844 issued to Yang on Jan. 1, 1993, disclosed a controlled voltage regulating circuit of the solar cell combined linear or chopping wave solid state switch element to get non-spark switch and make PWM voltage output from step voltage combined with linear voltage regulating or step voltage combined with chopping wave voltage regulating, therefore, by way of cascading the solid state switch with ability to linear voltage regulate or PWM modulate and control between the voltage switch points consisted of solar cell and diodes to form a linear continually regulating PWM output voltage circuit with low voltage as a valley and the second highest voltage as a peak, so as to form a linear or PWM controlled low ripple voltage output with valley voltage to peak voltage adjustable or voltage output with slowly step-up or step-down, and further comprised the limited or fixed the current or fixed voltage output regulating or slowly step-up or step-down voltage functions by feedback.

Another prior art related to the solar cell, such as, Taiwan Pat. No. 451542 issued to Liu, et al on Aug. 21, 2001, disclosed a method and circuit for an electronic product to automatically determine whether power is supplied from a solar cell or a conventional battery, wherein the circuit comprised a loader, for ordering an electronic product normally operating; a conventional battery, for providing power to the loader; a solar cell, parallel to the conventional battery for providing power to the loader, built-in a solar power converter for receiving and converting power received from the solar; an anti-backflow electronic element, cascading with the solar cell, so as to prevent the current from the conventional battery from backflowing to the solar cell by way of the resistance of the anti-backflow electronic element. However, the aforesaid patent still had the following shortcomings: 1. the voltage should be rose form the lower voltage to the higher voltage (if the power consumption of the loader is lower than the charging rate of the solar cell), or could not rise to the working voltage of the loader (if the power consumption of the loader was higher than the charging rate of the solar cell) when the electronic product was not be installed the battery and the solar cell be charged, thus the electronic product positioned at the loader end should not be reset correctly, or the electronic product positioned at the loader end would not work properly forever; 2. the voltage of the solar cell could not reach the working voltage of the loader forever when the electronic product was not be installed the battery and the solar cell be charged and provided power to the loader simultaneously; 3. the solar cell would provide power to the loader only when the voltage of the solar cell was higher then the voltage of the conventional battery, but if the charging rate of the solar rate was lower than the power consumption of the loader, the voltage of the solar cell would be quickly lower than the voltage of the battery, finally, the loader still needed power supplied from the conventional battery.

Furthermore, U.S. Pat. No. 6,801,967 issued to Nakamura, et al on Oct. 5, 2004, disclosed a wireless mouse unit comprising: a wireless mouse to generate signals to move a cursor across a display screen; a rechargeable secondary battery cell included in the wireless mouse; a connector cable having at one end thereof a USB connector for connecting to a USB connector located on a computer and a second connector at another end thereof; a USB-PS/2 conversion connector having a USB connector at one end thereof and a PS/2 connector at another end thereof; a receiver to receive the signals transmitted from the wireless mouse, wherein the receiver further comprises a connector detachably electrically connected to and powered by a computer via cable and an AC terminal detachably electrically connected to and powered by an AC adapter, so that the receiver is configured to be chargeable by either one of the connector and the AC terminal; a receiver connector to connect to the second connector; and a USB microcontroller unit to output a PS/2 mode signal when the USB connector at one end of the connector cable is connected to the computer via the USB-PS/2 converter connector. The aforesaid patent comprised a wireless mouse unit, a wireless mouse and its receiver, and also had a secondary battery built therein for using, therefore, the above mentioned shortcoming related to the using life and time of the battery still existed.

Therefore, the wireless computer peripheral device of the present invention uses voltage detector and electronic switch to control the power supply between the battery and solar energy storing device so as to extend the using time of the battery.

SUMMARY OF THE INVENTION

Therefore, it is a primary objective of the present invention to overcome the foregoing shortcomings of the prior art by providing a wireless computer peripheral device and its power supplying method, which uses a voltage detector and electronic switch to control the switch between the battery and solar energy storing device so as to extend the using time of the battery.

Another objective of the present invention is to overcome the foregoing shortcomings of the prior art by providing a wireless computer peripheral device and its power supplying method, which could accumulate solar energy to a default value then supply the energy to the wireless computer peripheral device so as to solve the system reset problem.

Another objective of the present invention is to overcome the foregoing shortcomings of the prior art by providing a wireless computer peripheral device and its power supplying method, which could improve the charge efficiency of the solar energy.

To achieve the foregoing objectives, a wireless computer peripheral device in accordance with the present invention comprises: a first power detecting unit with a set first threshold value, coupled to the first power and; and a second power detecting unit with a set second threshold value, coupled to the first power, second power and the first power detecting unit; thereby, the power energy supplied from the second power will be cut off and the power energy supplied from the first power will be provided to the wireless computer peripheral device for using when the power energy stored in the first power is higher than the power energy stored in the second power; and the power energy supplied from the first power will be cut off and the power energy supplied from the second power will be provided to the wireless computer peripheral device for using when the power energy stored in the first power is lower than or equal to the power energy stored in the second power.

Furthermore, according to another embodiment of the present invention, it further comprises a voltage converting circuit disposed between the second voltage detecting unit and the second power, wherein an input end of the voltage converting circuit is coupled to the second power for converting the second power than outputting; furthermore, the second threshold value is lower than the output voltage of the voltage converting circuit.

DETAILED DESCRIPTION OF THE PREFERRED EMBODIMENTS

Figure 1:
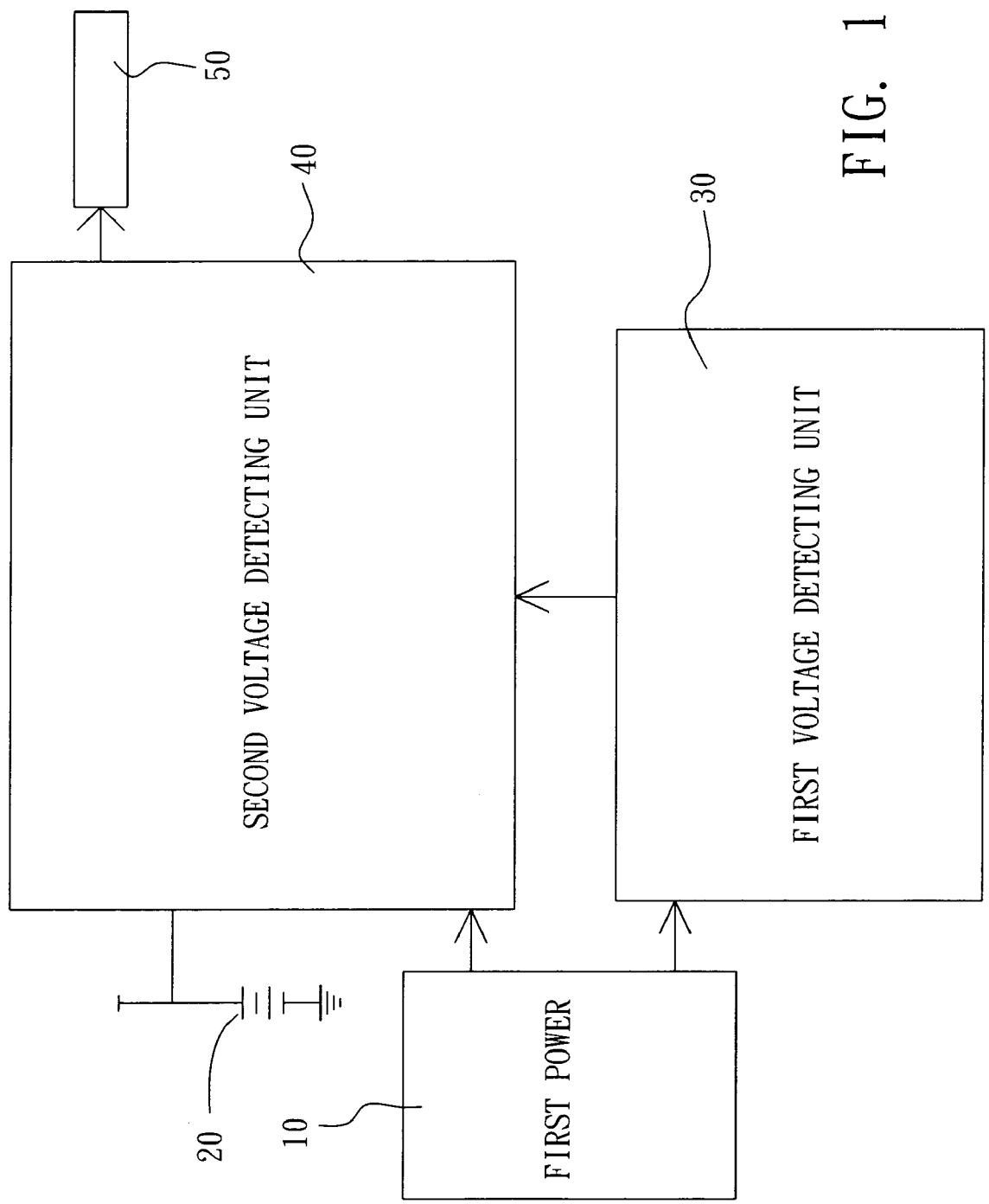
FIG. 1 is a block diagram of a wireless computer peripheral device according to a preferred embodiment of the invention.

Referring to FIG. 1, it shows a block diagram of a wireless computer peripheral device according to a preferred embodiment of the invention. As shown in the FIG., the wireless computer peripheral device of the present invention, which comprises: a first power 10; a second power 20; a first power detecting unit 30; and a second power detecting unit 40.

Wherein, the first power 10, for example but not limited to a fuel battery or an optical energy storing device, is disposed on the surface of the wireless computer peripheral device 50 and could be changed or added fuel battery by cartridge or fuel injection way, or it could absorb solar energy and convert it into power energy then store. Wherein, the wireless computer peripheral device 50 is for example but not limited to a wireless mouse, a wireless keyboard or other wireless peripheral device.

The second power 20, for example but not limited to a battery, is disposed in the wireless computer peripheral device 50 for providing power to the wireless computer peripheral device 50 for using.

The first power detecting unit 30 is coupled to the first power 10 and could determine the power energy stored in the first power 10 is higher or lower than a first threshold value.

The second power detecting unit 40 is coupled to the first power 10, second power 20 as well as the first power detecting unit 30 and could determine the power energy stored in the first power 10 is higher or lower than a second threshold value.

While operating, the power energy supplied from the second power 20 will be cut off and the power energy supplied from the first power 10 will be provided to the wireless computer peripheral device 50 for using when the power energy stored in the first power 10 is higher than the first threshold value; and when the power consumed by the wireless computer peripheral device 50 larger than the power converted by the first power 10, the voltage of the first power 10 will drop, and the power energy supplied from the first power 10 will be cut off and the power energy supplied from the second power 20 will be provided to the wireless computer peripheral device 50 for using when the voltage drops lower than the second threshold value such that could not be used by the wireless computer peripheral device 50, so as to extend the using time of the battery 20.

Furthermore, the first power 10 of the present invention could accumulate solar energy to a default value then supply the energy to the wireless computer peripheral device 50 so as to solve its system reset problem. Therefore, the wireless computer peripheral device of the present invention could solve the shortcomings of the prior arts described above.

Figure 2:
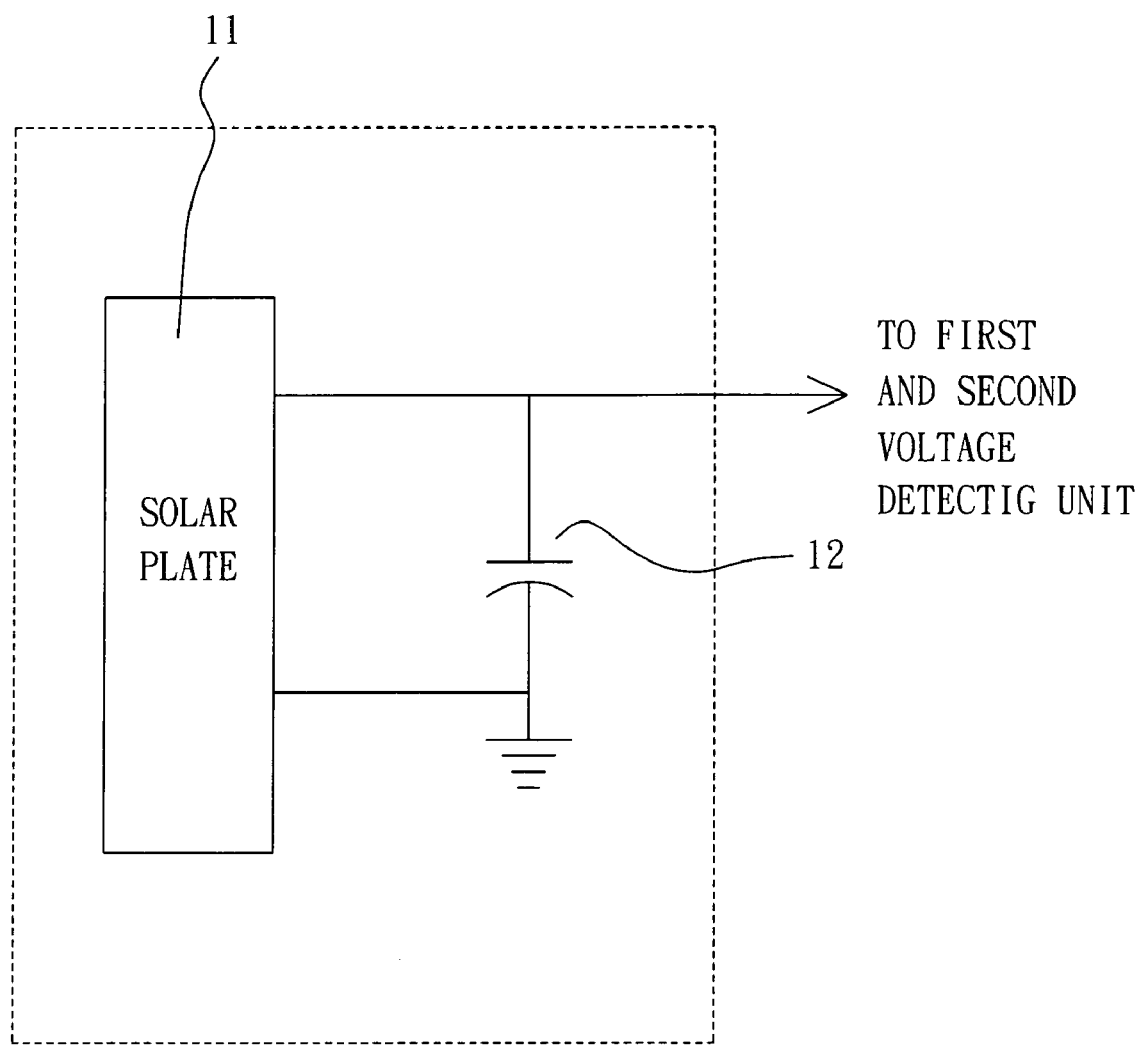
FIG. 2 is a detail block diagram of a first power 10 according to a preferred embodiment of the invention.

Referring to FIG. 2, it shows a detail block diagram of a first power 10 according to a preferred embodiment of the invention. As shown in the FIG., the first power 10 could be an optical energy storing device, it further comprises: a solar plate 11 and an energy storing device 12. The solar plate 11 is disposed outside the wireless computer peripheral device 50 for absorbing solar and converting it into power energy. The energy storing device 12, for example but not limited to a capacitor, is coupled to the solar plate 11 for storing the power energy outputted from the solar plate 11.

Figure 3:
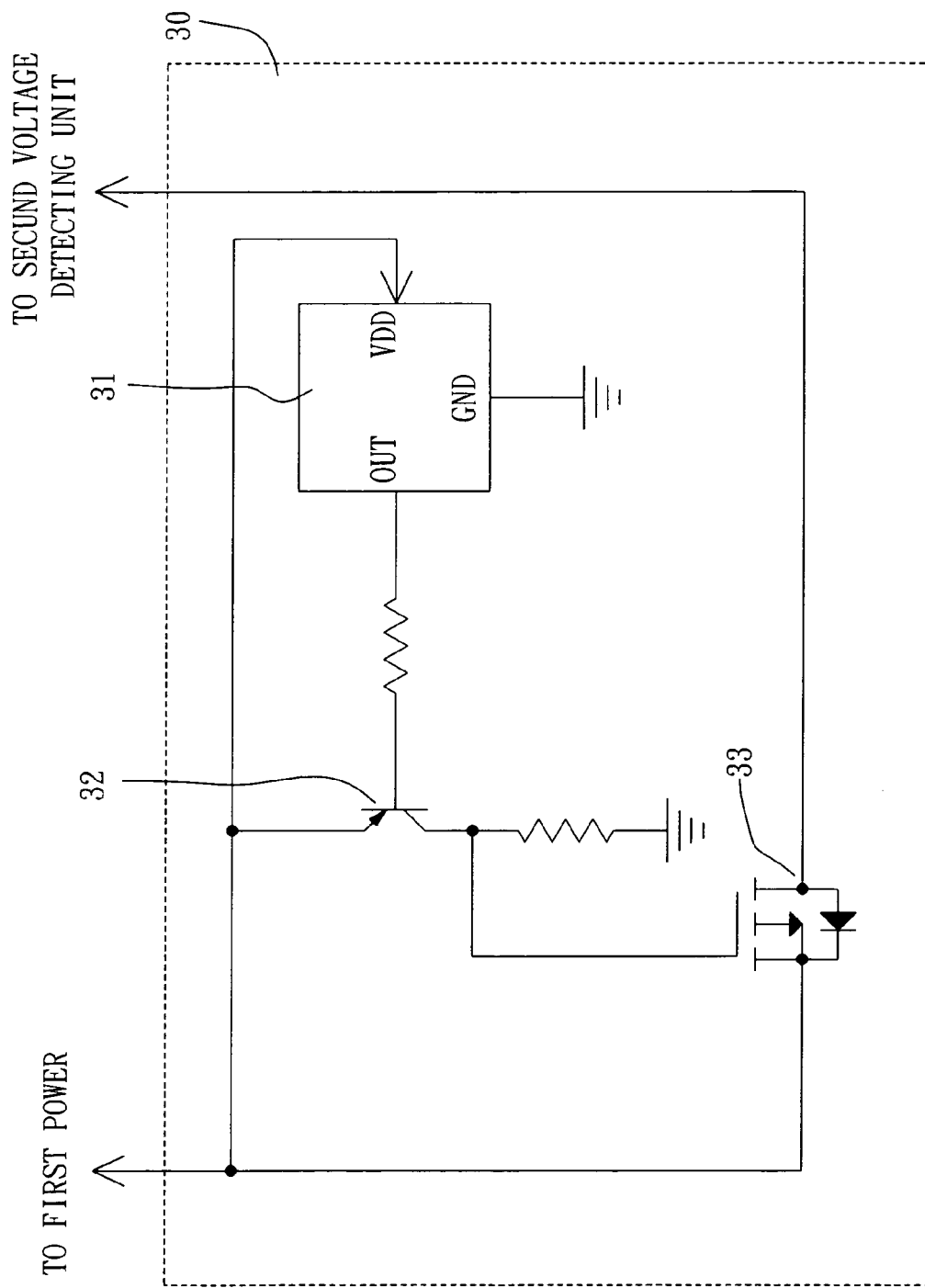
FIG. 3 is a detail block diagram of a first voltage detecting unit 30 according to a preferred embodiment of the invention.

Referring to FIG. 3, it shows a detail block diagram of a first voltage detecting unit 30 according to a preferred embodiment of the invention. As shown in the FIG., the first voltage detecting unit 30 of the present invention further comprises: a first voltage detector 31; a first switch 32; and a second switch 33.

The first voltage detector 31 is a three-end element and has a set first threshold value. Its input end is coupled to the optical energy storing device 10 for determining the power energy stored in the optical energy storing device 10 is higher than the first threshold value or not. Its output end will output high voltage when the voltage of its input end is higher than the first threshold value, otherwise its output end will output low voltage. That is, the first voltage detector 31 can determine if the power energy stored in the optical energy storing device 10 is higher than the first threshold value or not, if yes, then the second power 20 will be cut off and the optical energy storing device 10 will output power energy to the wireless computer peripheral device 50 for using.

The second switch 32 is for example but not limited to a PNP type transistor, and its control end is coupled to the output end of the first voltage detector 31. Wherein the control end is a base, output end is a collector and the emitter is coupled to the optical energy storing device 10.

The third switch 33 is for example but not limited to a P-channel MOSFET. Its control end is coupled to the output end of the first voltage detector 31, and another end is coupled to the optical energy storing device 10. The third switch 33 can be turned on or off according to the first voltage detector's control. Wherein the control end is a gate and the source is coupled to the optical energy storing device 10. The first switch 32 will be turned off and the second switch 33 will be turned on such that the power energy stored in the optical energy storing device 10 will be outputted to the input end of the second voltage detector 40 when the output end of the first voltage detector 31 outputs a high voltage level signal.

Figure 4:
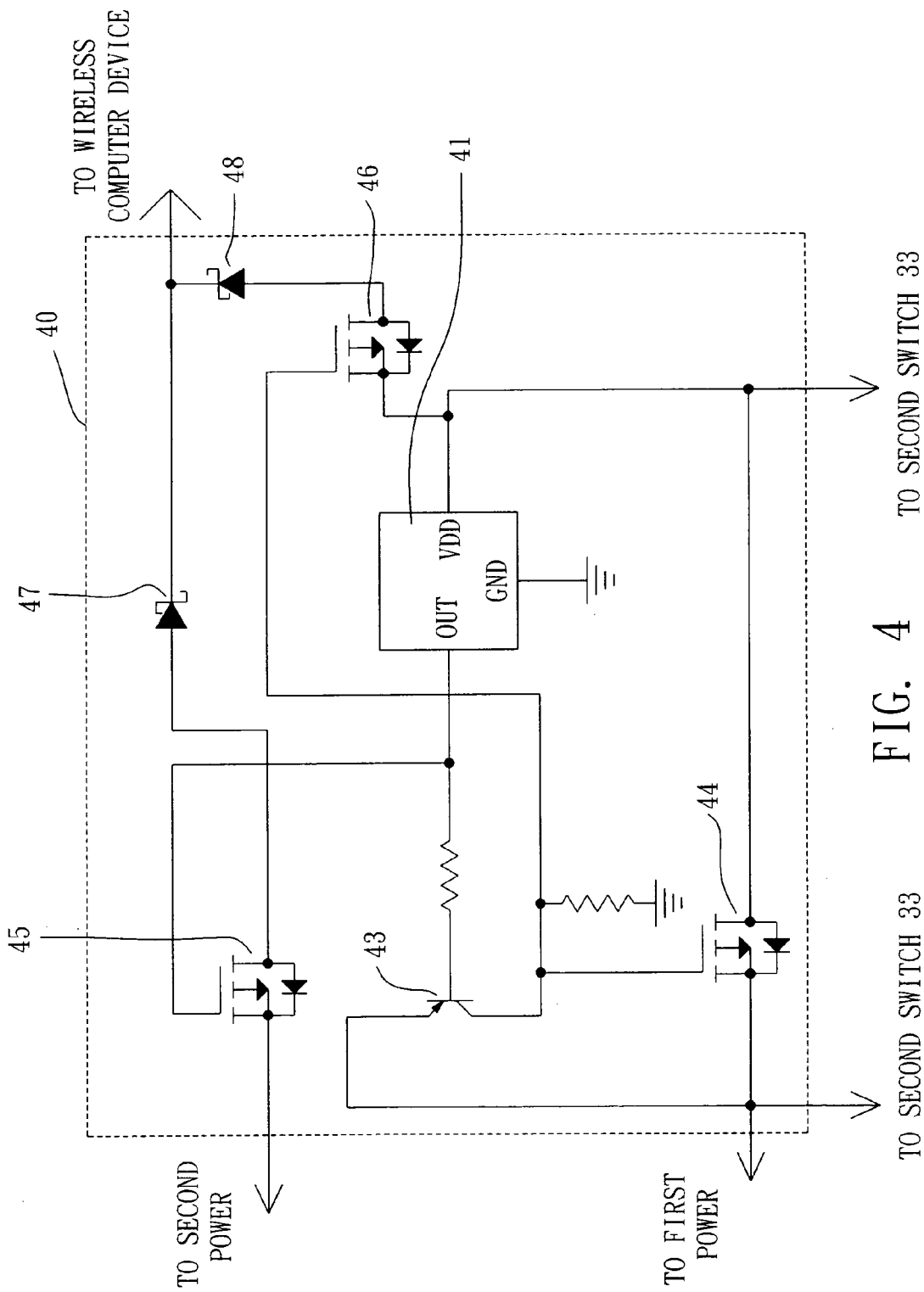
FIG. 4 is a detail block diagram of a second voltage detecting unit 40 according to a preferred embodiment of the invention.

Referring to FIG. 4, it shows a detail block diagram of a second voltage detecting unit 40 according to a preferred embodiment of the invention. As shown in the FIG., the second voltage detecting unit 40 of the present invention further comprises: a second voltage detector 41; a third switch 43; a fourth switch 44; a fifth switch 45 and a sixth switch 46.

The second voltage detector 41 is a three-end element and has a set second threshold value that is lower than the first threshold value. Its input end is coupled to the drain of the second switch 33 and its output end will output high voltage when the voltage of its input end is higher than the second threshold value, otherwise its output end will output low voltage. That is, the second voltage detector 41 can determine if the power energy stored in the optical energy storing device 10 is higher than the second threshold value or not, if yes, then the output end will output high voltage level such that the optical energy storing device 10 will output power energy to the wireless computer peripheral device 50 for using, if not, then the output end will output low voltage level such that the battery 20 will output power energy to the wireless computer peripheral device 50 for using.

The third switch 43 is for example but not limited to a PNP type transistor. Its control end is coupled to the output end of the second voltage detector 41. Wherein the control end is a base, output end is a collector and the emitter is coupled to the optical energy storing device 10.

The fourth switch 44 is for example but not limited to a P-channel MOSFET. Its control end is coupled to the output end of the third switch 43, and another end is coupled to the optical energy storing device 10. The fourth switch 44 can be turned on or off according to the third switch's control. Wherein the control end is a gate and the source is coupled to the optical energy storing device 10. The third switch 43 will be turned off and the fourth switch 44 will be turned on such that the power energy stored in the optical energy storing device 10 will be outputted to the input end of the second voltage detecting unit 40 and the source of the sixth switch 46 when the output end of the second voltage detector 41 outputs a high voltage level.

The fifth switch 45 is for example but not limited to a P-channel MOSFET. Its control end is coupled to the output end of the second voltage detector 41, input end is coupled to the second power 20 and output end is coupled to the wireless computer peripheral device 50. Wherein the control end is its gate. Furthermore, it further comprises a Zener diode 47 disposed between the output end of the fifth switch 45 and the wireless computer peripheral device 50.

The sixth switch 46 is for example but not limited to a P-channel MOSFET. Its control end is coupled to the output end of the third switch 43 and output end is coupled to the wireless computer peripheral device 50. Furthermore, it further comprises a Zener diode 48 disposed between the output end of the sixth switch 46 and the wireless computer peripheral device 50.

Figure 5:
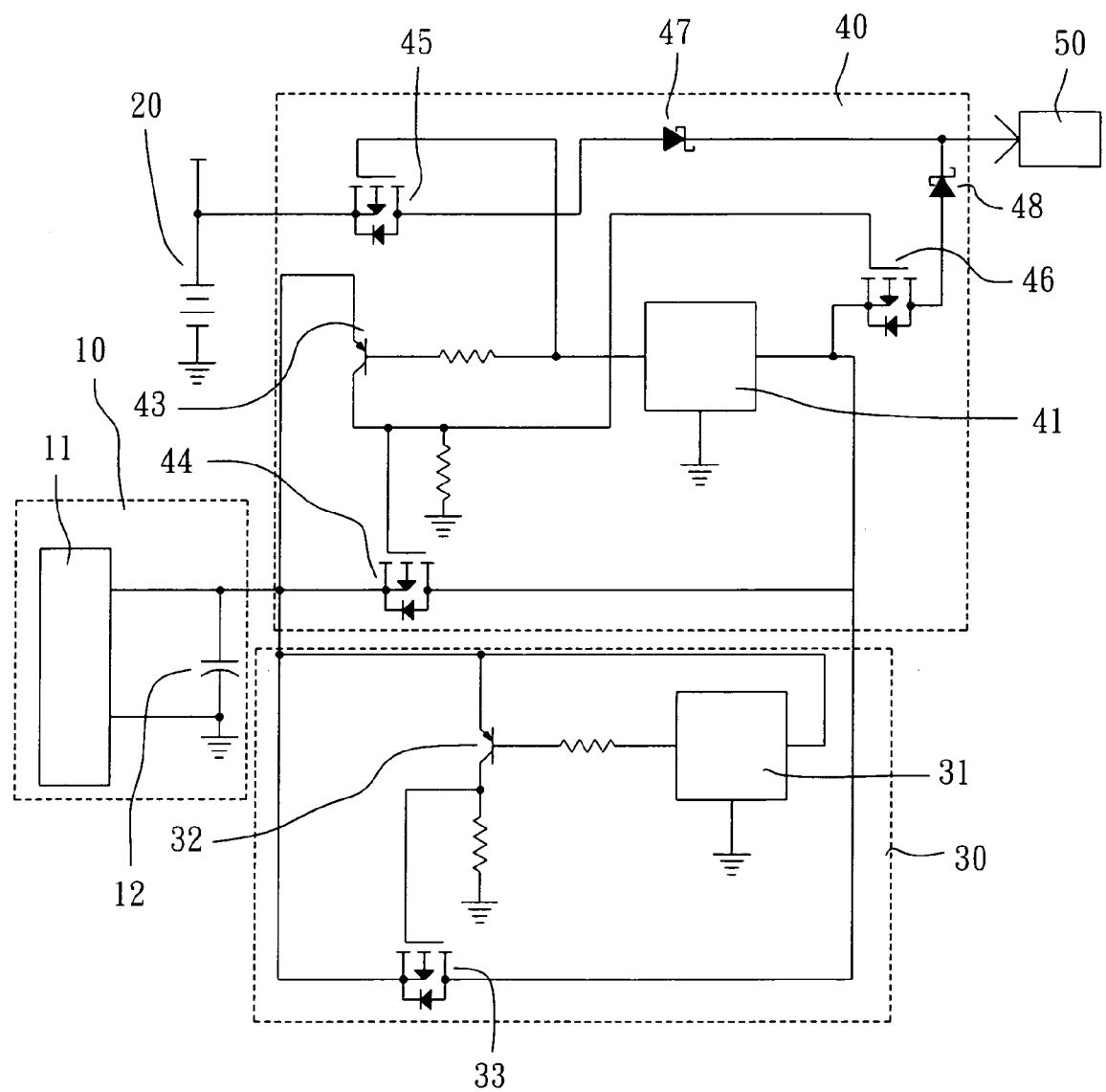
FIG. 5 is a connecting diagram of a first power 10, second power 20, first voltage detecting unit 30, second voltage detecting unit 40 and wireless computer peripheral device 50 according to a preferred embodiment of the invention.

Referring to FIG. 5, it shows a connecting block diagram of a first power 10, second power 20, first voltage detecting unit 30, second voltage detecting unit 40 and wireless computer peripheral device 50 according to a preferred embodiment of the invention. As shown in the FIG., the working principle of the wireless computer peripheral device of the present invention is described follows: the solar plate 11 could absorb the solar energy and convert it into power energy and store in the energy storing device 12. The output end of the first voltage detector 31 will output a high voltage level to the first switch 31 and force the second switch be turned on when the output voltage of the energy storing device 12 is higher than the first threshold value. Such that the power energy of the energy storing device 12 will be supplied to the wireless computer peripheral device 50 through the second switch 33, sixth switch 46 and Zener diode 48. This moment, the input voltage of the second voltage detector 41 is higher than the second threshold value, therefore, the output end of the second voltage detector 41 will output high voltage level signal to force the fifth switch 45 be turned off, at the same time the third switch 43 will reverse the high voltage level signal and turn off the fourth switch 44 and turn on the sixth switch 46.

when the power consumed by the wireless computer peripheral device 50 larger than the power charged rate of the optical energy storing device 10, the voltage of the energy storing device 12 will drop due to the set second threshold value is lower than the first threshold value of the first voltage detector 31. Therefore, the second switch 33 will be turned off when the voltage of the energy storing device 12 continuingly drops to the set first threshold value, and the power energy supplied from the energy storing device 12 will be provided to the wireless computer peripheral device 50 for using through the fourth switch 44.

The output end of the second voltage detector 41 will output a low voltage level to force the fifth switch 45 be turned off when the voltage of the energy storing device 12 continuingly drops to the set second threshold value of the second voltage detector 41. Such that the power energy supplied from the battery 20 will be provided to the wireless computer peripheral device 50 for using through the Zener diode 47. The low voltage level outputted from the second voltage detector 41 also will force the fourth switch 44 be turned off through the third switch 43, at the same time, the battery 20 will provide power energy to the wireless computer peripheral device 50.

The second switch 33 and fourth switch 44 will not provide power energy to the wireless computer peripheral device 50 when they are turned off. The solar plate 11 continuingly provides power energy to the low voltage energy storing device 12 for charging. The energy storing device 12 will provide power energy to the wireless computer peripheral device 50 until its output voltage is higher than the first threshold value of the first voltage detector 31.

Figure 6:
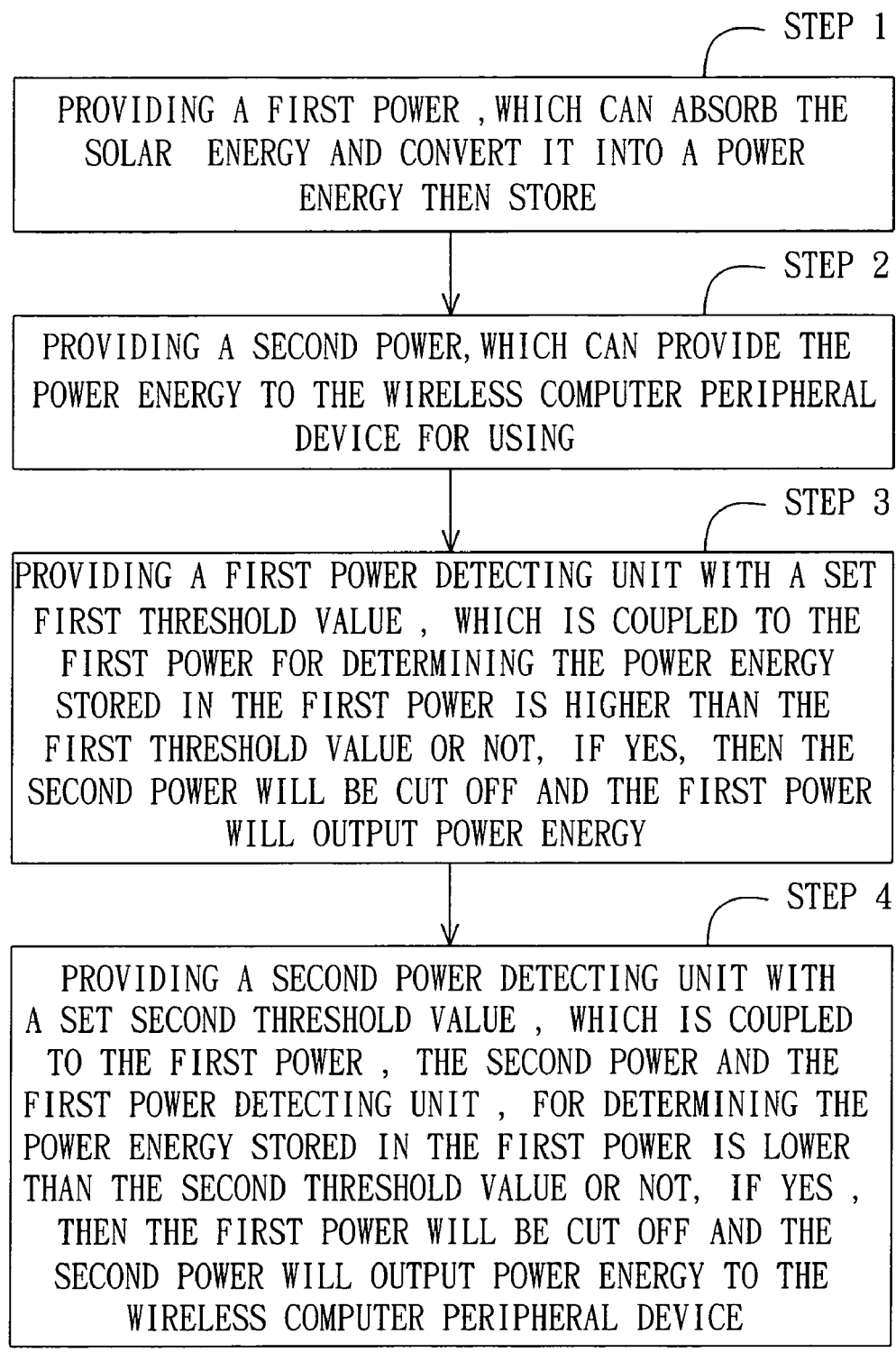
FIG. 6 is a flowchart diagram of a power supplying method for wireless computer peripheral device according to a preferred embodiment of the invention.

Furthermore, the present invention also provides a power supplying method for a wireless computer peripheral device. Referring to FIG. 6, it shows a flowchart diagram of a power supplying method for a wireless computer peripheral device according to a preferred embodiment of the invention. As shown in the FIG., the power supplying method for a wireless computer peripheral device of the present invention comprises the following steps of: providing a first power 10, which can absorb the solar energy and convert it into a power energy then store (step 1); providing a second power 20, which can provide the power energy to the wireless computer peripheral device 50 for using (step 2); providing a first power detecting unit 30 with a set first threshold value, which is coupled to the first power 10 for determining the power energy stored in the first power 10 is higher than the first threshold value or not, if yes, then the second power 20 will be cut off and the first power 10 will output power energy (step 3); and providing a second power detecting unit 40 with a set second threshold value, which is coupled to the first power 10, the second power 20 and the first power detecting unit 30, for determining the power energy stored in the first power 10 is lower than the second threshold value or not, if yes, then the first power 10 will be cut off and the second power 20 will output power energy to the wireless computer peripheral device 50 (step 4).

In step 1, the first power 10 is for example but not limited to a power energy stored in an optical energy (such as solar) storing device.

In step 2, the second power 20 is for example but not limited to a battery, and the wireless computer peripheral device 50 is for example but not limited to a wireless mouse, a wireless keyboard or other wireless peripheral devices.

In step 3, the first threshold value of the first power detecting unit 30 is higher than the second threshold value of the second power detecting unit 40.

In step 4, the power energy supplied from the first power 10 or the second power 20 can be changed and provided to the wireless computer peripheral device 50 for using according to the voltage value detected by the first power detecting unit 30 and second power detecting unit 40, so as to extend the using time of the battery 20. Furthermore, the detailed description of this step please refers to the aforesaid descriptions of FIG. 1~FIG. 4.

Figure 7:
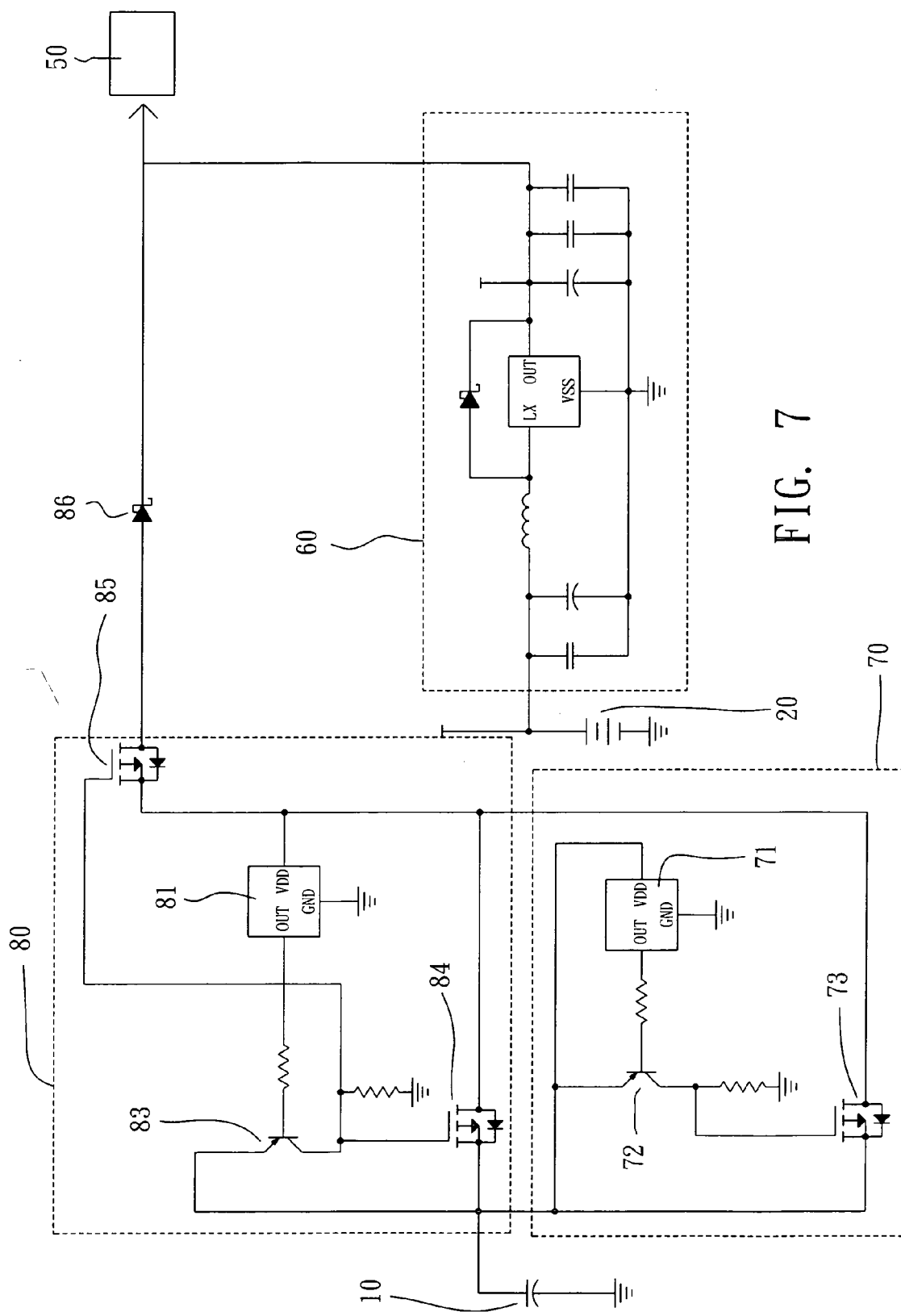
FIG. 7 is a block diagram of a wireless computer peripheral device according to another preferred embodiment of the invention.

Referring to FIG. 7, it shows a block diagram of a wireless computer peripheral device according to another preferred embodiment of the invention. As shown in the FIG., the wireless computer peripheral device of the present invention, which comprises: a first power 10; a second power 20; a voltage converting circuit 60; a first power detecting unit 70; and a second power detecting unit 80.

Wherein, the first power 10, for example but not limited to a fuel battery or an optical energy storing device, is disposed on the surface of the wireless computer peripheral device 50 and could be changed or added fuel battery by cartridge or fuel injection way, or it could absorb solar energy and convert it into power energy then store. Wherein the wireless computer peripheral device 50 is for example but not limited to a wireless mouse, a wireless keyboard or other wireless peripheral device. Furthermore, the first power 10 could be an optical energy storing device, it further comprises: a solar plate 11 and an energy storing device 12. The solar plate 11 is disposed outside the wireless computer peripheral device 50 for absorbing solar and converting it into power energy. The energy storing device 12, for example but not limited to a capacitor, is coupled to the solar plate 11 for storing the power energy output by the solar plate 11.

The second power 20, for example but not limited to a battery, is disposed in the wireless computer peripheral device 50 for providing power to the wireless computer peripheral device 50.

The voltage converting circuit 60 is for example but not limited to a DC-DC converter and its input end is coupled to the second power 20 for converting the second power 20 than outputting to the wireless computer peripheral device 50.

The first power detecting unit 70 is coupled to the first power 10 and has a set first threshold value. Wherein the first threshold value is higher than the output voltage of the voltage converting circuit 60.

The second power detecting unit 80 is coupled to the first power 10, the first power detecting unit 70 and has a set second threshold value. Wherein the second threshold value is lower than or equal to the output voltage of the voltage converting circuit 60. Furthermore, the first power detecting unit 70 further comprises a first voltage detector 71; a first switch 72 and a second switch 73.

The first voltage detector 71 is a three-end element and has a first threshold value. Its input end is coupled to the optical energy storing device 10. Its output end will output high voltage when the voltage of its input end is higher than the first threshold value, otherwise its output end will output low voltage. That is, the first voltage detector 71 can determine the power energy stored in the optical energy storing device 10 is higher than the first threshold value or not, if yes, then the output end of the first voltage detector 71 will output high voltage level signal so as to let the optical energy storing device 10 could output power energy to the wireless computer peripheral device 50.

The first switch 72 is for example but not limited to a PNP type transistor. Its control end is coupled to the output end of the first voltage detector 71. Wherein the control end is a base, output end is a collector and the emitter is coupled to the optical energy storing device 10.

The second switch 73 is for example but not limited to a P-channel MOSFET. Its control end is coupled to the output end of the first voltage detector 71, and another end is coupled to the optical energy storing device 10. The second switch 73 can be turned on or off according to the first voltage detector's control. Wherein the control end is a gate and the source is coupled to the optical energy storing device 10. The first switch 72 will be turned off and the second switch 73 will be turned on such that the power energy stored in the optical energy storing device 10 will be outputted to the input end of the second voltage detector 80 when the output end of the first voltage detector 71 outputs a high voltage level.

Furthermore, the second voltage detecting unit 80 of the present invention further comprises: a second voltage detector 81; a third switch 83; a fourth switch 84 and a fifth switch 85.

The second voltage detector 81 is also a three-end element and has a set second threshold value that is lower than or equal to the output voltage of the voltage converting circuit 60. Wherein its input end is coupled to the drain of the second switch 73 and its output end will output high voltage level when the voltage of its input end is higher than the second threshold value, otherwise its output end will output low voltage level. That is, the second voltage detector 81 can determine if the power energy stored in the optical energy storing device 10 is higher than the second threshold value or not, if yes, then its output end will output high voltage such that the optical energy storing device 10 will output power energy to the wireless computer peripheral device 50, if not, then its output end will output low voltage such that the battery 20 will output power energy to the wireless computer peripheral device 50.

The third switch 83 is for example but not limited to a PNP type transistor. Its control end is coupled to the output end of the second voltage detector 81. Wherein the control end is a base, output end is a collector and the emitter is coupled to the optical energy storing device 10.

The fourth switch 84 is for example but not limited to a P-channel MOSFET. Its control end is coupled to the output end of the third switch 83, and another end is coupled to the optical energy storing device 10. The fourth switch 84 can be turned on or off according to the third switch's control. Wherein the control end is a gate and the source is coupled to the optical energy storing device 10. The third switch 83 will be turned off and the fourth switch 44 will be turned on such that the power energy stored in the optical energy storing device 10 will be outputted to the input end of the second voltage detecting unit 80 and the source of the fifth switch 85 when the output end of the second voltage detector 81 outputs a high voltage level.

The fifth switch 85 is for example but not limited to a P-channel MOSFET. Its control end is coupled to the output end of the second voltage detector 81, input end is coupled to the output end of the second switch 73 and fourth switch 84 and output end is coupled to the wireless computer peripheral device 50. Wherein the control end is its gate. Furthermore, it further comprises a Zener diode 86 disposed between the output end of the fifth switch 85 and the wireless computer peripheral device 50.

The working principle of the wireless computer peripheral device of the present invention is described follows: the second switch 73, fourth switch 84 and fifth switch 85 will be turned on so as to let the first power 10 directly output power energy to the wireless computer peripheral device 50 through the fourth switch 84 and fifth switch 85 when the output voltage of the first power 10 is higher than the first threshold value (the first threshold value is higher than the output voltage of the voltage converting circuit 60); this moment, due to the output voltage is higher than the output voltage of the voltage converting circuit 60, therefore, the output current of the second power 20 is zero.

When the power consumed by the wireless computer peripheral device 50 larger than the power converted by the first power 10, the output voltage of the first power 10 will drop, and the output current of the second power 20 will become a non-zero value if the output voltage drops and equals the output voltage of the voltage converting circuit 60. The fourth switch 84 will be turned off once the output voltage of the first power 10 is lower than the second threshold value of the second power detector 81, such that the wireless computer peripheral device 50 will use the power energy provided from the second power 20.

The high voltage of supplied power range of the first power 10 is set by the first voltage detector 71, and the low voltage of supplied power range is set by the second voltage detector 81 if there is no second power 20 installed or the second power 20 has no power. The setting range of the high voltage and low voltage can be determined by referring to the operating voltage range of the circuit elements of the wireless computer peripheral device 50.

Therefore, the wireless computer peripheral device of the present invention has the following advantages: 1, using voltage detector and electronic switches to control the power supply between the battery and solar energy storing device so as to extend the using time of the battery; 2, accumulating solar energy to a default value then supply the energy to the wireless computer peripheral device so as to solve its system reset problem and 3, increasing the charging efficiency of solar energy; therefore, the wireless computer peripheral device of the present invention can solve the drawbacks of the prior arts described before.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A wireless computer peripheral device, comprising:
   a first power and a second power;
   a first power detecting unit with a set first threshold value, coupled to said first power and; and
   a second power detecting unit with a set second threshold value, coupled to said first power, second power and said first power detecting unit;
   wherein said first power detecting unit and said second power detecting unit are configured so that:
      power energy supplied from said second power will be cutoff and said power energy supplied from said first power will be provided to said wireless computer peripheral device for using when the power energy stored in said first power is higher than the power energy stored in said second power; and
      said power energy supplied from said first power will be cut off and said power energy supplied from said second power will be provided to said wireless computer peripheral device for using when the power energy stored in said first power is lower than or equal to said power energy stored in said second power,
   wherein said first power is an optical energy storing device and said second power is a battery,
   wherein said optical energy storing device further comprises:
      a solar plate, disposed outside said wireless computer peripheral device for absorbing solar and converting it into power energy; and
      an energy storing device, coupled to said solar plate, for storing said power energy output by said solar plate.

2. The wireless computer peripheral device of claim 1, wherein said energy storing device is a capacitor.

3. The wireless computer peripheral device of claim 1, wherein said first power detecting unit further comprises:
   a first voltage detector, which input end is coupled to said optical energy storing device, for determining said power energy stored in said optical energy storing device is higher than said first threshold value or not;
   a first switch, which control end is coupled to an output end of said first voltage detector; and a second switch, which control end is coupled to said output end of said first voltage detecting unit and another end is coupled to said optical energy storing device and can be turned on or off according to said first switch's control.

4. The wireless computer peripheral device of claim 3, wherein said second power detecting unit further comprises:
   a second voltage detector, which input end is coupled to said output end of said first voltage detector, for determining said power energy stored in said optical energy storing device is higher than said second threshold value or not;
   a third switch, which control end is coupled to said output end of said second voltage detector;
   a fourth switch, which control end is coupled to said output end of said second voltage detector;
   a fifth switch, which control end is coupled to said output end of said second voltage detector, and input end is coupled to said second power as well as output end is coupled to said wireless computer peripheral device; and
   a sixth switch, which control end is coupled to said output end of said third switch and output end is coupled to said wireless computer peripheral device.

5. The wireless computer peripheral device of claim 1, wherein said first threshold value is higher than said second threshold value.

6. The wireless computer peripheral device of claim 1, wherein it further comprises a voltage converting circuit disposed between said second voltage detecting unit and said second power, wherein an input end of said voltage converting circuit is coupled to said second power for converting said second power than outputting;
   furthermore, said second threshold value is lower than said output voltage of said voltage converting circuit.

7. A wireless computer peripheral device, comprising:
a first power and a second power;
a voltage converting circuit, coupled to said second power for converting said second power than outputting;
a first power detecting unit with a set first threshold value, coupled to said first power, wherein said first threshold value is higher than said output voltage of said voltage converting circuit; and
a second power detecting unit with a set second threshold value, coupled to said first power and said first power detecting unit, wherein said second threshold value is lower than or equal said output voltage of said voltage converting circuit;
wherein said first power detecting unit and said second power detecting unit are configured so that:
power energy supplied from said second power will be cut off and said power energy supplied from said first power will be provided to said wireless computer peripheral device for using when the power energy stored in said first power is higher than the power energy stored in said second power; and
said power energy supplied from said first power will be cut off and said power energy supplied from said second power will be provided to said wireless computer peripheral device for using when the power energy stored in said first power is lower than or equal to said power energy stored in said second power
wherein said first power is an optical energy storing device and said second power is a battery,
wherein said optical energy storing device further comprises:
a solar plate, disposed outside said wireless computer peripheral device for absorbing solar and converting it into power energy; and
an energy storing device, coupled to said solar plate, for storing said power energy output by said solar plate.

8. The wireless computer peripheral device of claim 7, wherein said energy storing device is a capacitor.

9. The wireless computer peripheral device of claim 7, wherein said first power detecting unit further comprises:
a first voltage detector, which input end is coupled to said optical energy storing device, for determining said power energy stored in said optical energy storing device is higher than said first threshold value or not;
a first switch, which control end is coupled to an output end of said first voltage detector; and
a second switch, which control end is coupled to said output end of said first switch and another end is coupled to said optical energy storing device and can be turned on or off according to said first switch's control.

10. The wireless computer peripheral device of claim 9, wherein said second power detecting unit further comprises:
a second voltage detector, which input end is coupled to said output end of said first voltage detector, for determining said power energy stored in said optical energy storing device is higher than said second threshold value or not;
a third switch, which control end is coupled to said output end of said second voltage detector;
a fourth switch, which control end is coupled to said output end of said second voltage detector; and
a fifth switch, which control end is coupled to said output end of said second voltage detector, and input end is coupled to said second power as well as output end is coupled to said wireless computer peripheral device.

11. The wireless computer peripheral device of claim 7, wherein said voltage converting circuit is a DC to DC voltage converting circuit and its input end is coupled to said second power for converting said second power than outputting to said wireless computer peripheral device.

12. The wireless computer peripheral device of claim 7, wherein said high voltage of supplied power range of said first power is set by said first power determining unit, and said low voltage of supplied power range is set by said second power determining unit if without said second power or said second power without power, and wherein said setting range of said high voltage and low voltage can be determined by referring to the operating voltage range of the circuit elements of said wireless computer peripheral device.

13. A power supplying method for a wireless computer peripheral device, which comprises the following steps of:
providing a first power;
providing a second power;
providing a first power detecting unit with a set first threshold value, which is coupled to said first power for determining said power energy stored in said first power is higher than said first threshold value or not, if yes, then said second power will be cut off and said first power will output power energy; and
providing a second power detecting unit with a set second threshold value, which is coupled to said first power, said second power and said first power detecting unit being configured to determine whether said power energy stored in said first power is lower than said second threshold value or not, if yes, then said first power will be cut off and said second power will output power energy to said wireless computer peripheral device,
wherein said first cower is a power energy stored in an optical energy storing device and said second power is a battery.

14. The power supplying method of claim 13, wherein said energy storing device is a capacitor.

15. The power supplying method of claim 13, wherein it further comprises a voltage converting circuit disposed between said second voltage detecting unit and said second power, wherein an input end of said voltage converting circuit is coupled to said second power for converting said second power than outputting;
furthermore, said second threshold value is lower than said output voltage of said voltage converting circuit.

* * * * *